United States Patent [19]
Sugiura et al.

[11] Patent Number: 5,541,365
[45] Date of Patent: Jul. 30, 1996

[54] BEAM WELDING TERMINAL STRUCTURE

[75] Inventors: Masuo Sugiura; Yutaka Sakakibara, both of Shizuoka, Japan

[73] Assignee: Yazaki Corporation, Tokyo, Japan

[21] Appl. No.: 208,674

[22] Filed: Mar. 11, 1994

[30] Foreign Application Priority Data

Mar. 15, 1993 [JP] Japan .................................. 5-053915
Jun. 21, 1993 [JP] Japan .................................. 5-149124

[51] Int. Cl.$^6$ .................................................. H01R 4/02
[52] U.S. Cl. ..................... 174/94 R; 29/860; 174/70 R; 174/78; 174/84 R; 219/121.64; 439/874; 439/875
[58] Field of Search ............................... 174/94 R, 84 R, 174/78, 90, 70 R, 259; 439/874, 875, 217; 29/843, 860; 219/121.63, 121.64

[56] References Cited

U.S. PATENT DOCUMENTS

| | | | |
|---|---|---|---|
| 3,717,842 | 2/1973 | Douglas, Jr. | 174/84 R |
| 3,742,122 | 6/1973 | Blavos et al. | 174/94 R |
| 4,687,264 | 8/1987 | Shuey | 439/92 |
| 4,692,121 | 9/1987 | Arbogast, Jr. | 439/874 |
| 4,774,394 | 9/1988 | Lemke | 219/121.64 |
| 5,300,755 | 4/1994 | Nishitani et al. | 219/121.63 |

FOREIGN PATENT DOCUMENTS 5-208287  8/1993  Japan ................................ 219/121.63

*Primary Examiner*—Morris H. Nimmo
*Attorney, Agent, or Firm*—Sughrue, Mion, Zinn, Macpeak & Seas

[57] ABSTRACT

To provide a beam welding terminal structure which holds a connection member to be connected, such as a wire, from opposite sides thereof, and firmly welds the connection member by irradiation of a beam such as a laser beam, a beam welding terminal structure includes holding walls at opposite sides, and a connection member to be connected is welded to the holding walls by irradiation of a beam. A projection extends from at least one of the holding walls and beyond the connection member in a direction of the height. A rectangular wave-shaped base wall has longitudinal side portions, extending in a direction intersecting the connection member, and transverse side portions extending parallel to the connection member. The holding walls each having the projection are formed respectively on the plurality of transverse side portions, and a pair of opposed holding walls are disposed respectively on opposite sides of the connection member, and are formed on one of the longitudinal side portions or each of more than one of the longitudinal side portions. In another form of structure, central portions of the pair of holding walls are bent inwardly to provide a reduced-width portion, and the reduced-width portion has projections extending beyond the connection member in a direction of the height, and the projection and the holding wall are interconnected by a mountain-like curved guide portion.

8 Claims, 8 Drawing Sheets

BEAM WELDING TERMINAL STRUCTURE

BACKGROUND OF THE INVENTION

This invention relates to a beam welding terminal structure which can firmly weld or connect a connection member to be connected, such as a wire, by irradiation of a beam such as a laser beam, while holding the connection member from opposite sides thereof.

FIG. 20 shows a conventional beam welding terminal structure disclosed in Japanese Patent Unexamined Publication No. 59-107786.

This structure is formed integrally on a front end portion of an electrically-conductive plate 30 such as a bus bar, and a pair of holding walls 32 and 32 for holding a wire 5, such as a thin nickel wire, therebetween are formed upright on opposite sides of a bottom plate portion 31, respectively. The height of the holding walls 32 is generally equal to the diameter of the wire 5, and laser beams 6 and 6 are applied respectively to points (intimate contact portions) of contact of the pair of holding walls 32 and 32 with the wire 5, as illustrated, thereby welding or connecting upper portions of the holding walls 32 to the wire 5.

In the above structure, however, the welding must be effected for each of the pair of holding walls 32 and 32, and therefore there has been encountered a problem that much time and labor are required. Therefore, there has been made an attempt in which only one of the pair of holding walls 32 is welded as shown in FIGS. 21 and 22 (a wire diameter d: 0.8 mm; a test product used: the thickness of holding wall 32: 0.8 mm, the height h of holding wall 32: 0.72 mm=0.9d), in which case a fused portion 33 is small, and therefore the welding strength is low, thus inviting a problem that this structure is not suited for practical use.

With the above problems in view, it is an object of this invention to provide a beam welding terminal structure in which much time and labor are not required for welding a connection member to be connected, such as a wire, and besides the connection member can be firmly welded.

SUMMARY OF THE INVENTION

In order to achieve this and other objects, the present invention provides a beam welding terminal structure comprising holding walls for a connection member to be connected which holding walls are formed respectively at opposite sides, wherein the holding wall and the connection member are welded together by irradiation of a beam. In a first structure of the invention, a projection for fusion purposes is formed on at least one of the holding walls, and extends beyond the connection member in a direction of the height. In a second structure of the invention, central portions of the pair of holding walls are bent inwardly to provide a reduced-width portion, and the reduced-width portion has projections extending beyond the connection member in a direction of the height, and the projection and the holding wall are interconnected by a mountain-like curved guide portion.

In the first structure, there can be provided a rectangular wave-shaped bent base wall having longitudinal side portions, extending in a direction intersecting the connection member, and transverse side portions extending parallel to the connection member, and the holding walls each having the projection are formed respectively on the plurality of transverse side portions, and a pair of opposed holding walls are disposed respectively on opposite sides of the connection member, and are formed on one of the longitudinal side portions or each of more than one of the longitudinal side portions.

In the above first structure, when the projection extending from the holding wall is subjected to the beam applied directly or through the connection member, the projection is fused to form a large fused portion by which the connection member is firmly welded.

In the second structure, the projections extending in the direction of the height are similarly fused to weld the connection portion. In this structure, the upper edges (guide portions) of the projections smoothly guide the connection member, such as a wire, into the space between the pair of holding walls.

In the first structure, if a plurality of projections are provided, the connection member, such as a wire, can be more firmly connected fixedly through fusion of the plurality of projections. One or more pairs of holding walls hold the connection member to fixedly position the same, and the welding of the connection member to the projections is enhanced.

The holding walls may be arranged to define a path for said connection member so that said projection is bent outwardly when the connection member is inserted into the holding path.

It is preferable that the holding wall having the projection be substantially twice as high as a diameter of said connection member.

A pair of holding walls each having the projections may be arranged to face each other.

A plurality of projections are arranged in a staggered manner on the holding walls.

DESCRIPTION OF THE PREFERRED EMBODIMENTS

Figure 1:
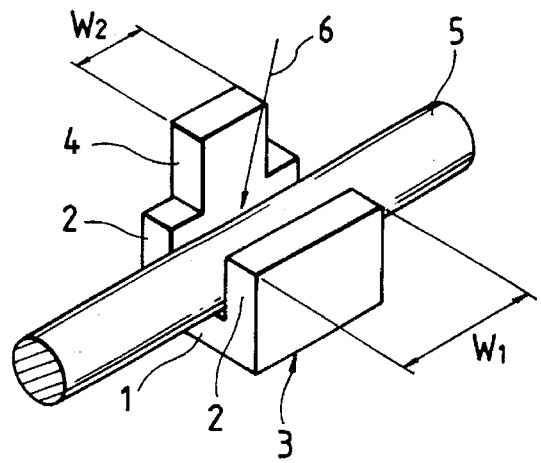
FIG. 1 is a perspective view of a first embodiment of a beam welding terminal structure of the present invention.
Figure 2:
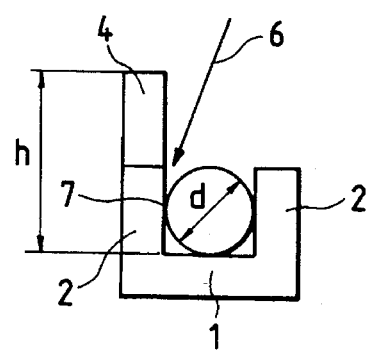
FIG. 2 is a side-elevational view of the above structure.

FIGS. 1 and 2 shows a first embodiment of a beam welding terminal structure of the present invention.

This structure includes a terminal body 3 of a generally channel-shaped cross-section having a pair of holding walls 2 and 2 formed upright respectively on opposite sides of a bottom wall 1. A projection 4 for fusing purposes is formed integrally on one of the holding walls 2, and extends therefrom in a direction of the height. This structure can be formed integrally with a bus bar (not shown) or the like, as is the case with the conventional structure.

The projection 4 is formed centrally of the holding wall 2, and has a thickness equal to that of the holding wall, and has a width $w_2$ smaller than a longitudinal width $w_1$ of the holding wall. Namely, the projection 4 is smaller in volume than the holding wall 2. In this embodiment, a height h from the bottom wall 1 to the top of the projection 4 is about twice larger than the diameter d of a connection member in the form of a wire 5 (a single-core wire with a thin covering (1 to 3 μm) of polyurethane or polyester, or a stranded wire with a covering removed). Preferably, the height h of the projection 4 should be not less than the diameter d of the wire, and should be not more than three times larger than the wire diameter d. If the height h is more than three times larger, the volume and the heat capacity are not balanced with the wire 5, so that a good welding can not be achieved.

Figure 3:
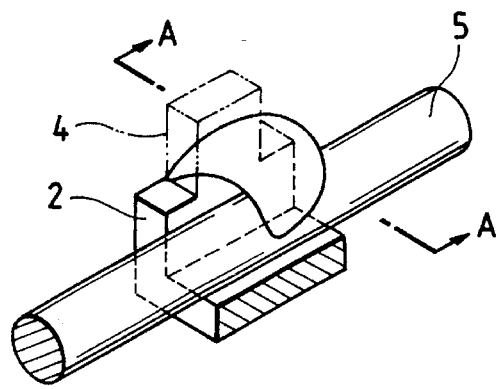
FIG. 3 is a perspective view showing a welded condition.
Figure 4:
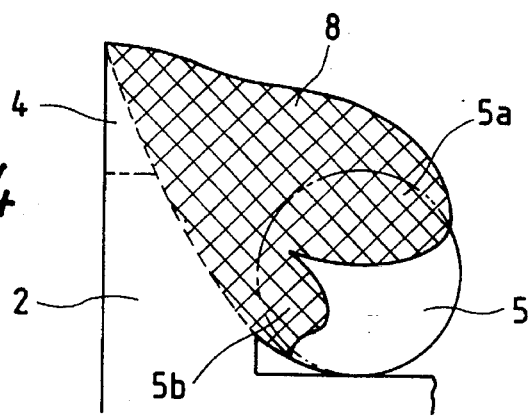
FIG. 4 is a cross-sectional view taken along the line A—A of FIG. 3.

Preferably, a beam 6 such as a laser beam is irradiated toward a portion 7 of intimate contact between the holding wall 2 and the wire 5, and as shown in FIGS. 3 and 4 (the wire diameter d: 0.8 mm; a test product used: the thickness t of the holding wall 2: 0.8 mm, the height h of the projection 4: 1.3 mm=1.6d), since the heated projection 4 is smaller in volume than the holding wall 2, the projection 4 melts together with the holding wall 2 as at 8, and is fused to the upper portion of the wire 5 in overlying relation thereto. As a result, one side 5b of the holding wall 2 is fused to the generally upper half of the wire 5, so that the wire is firmly connected to the holding wall 2, as shown in a cross-sectional view of FIG. 4.

Figure 5:
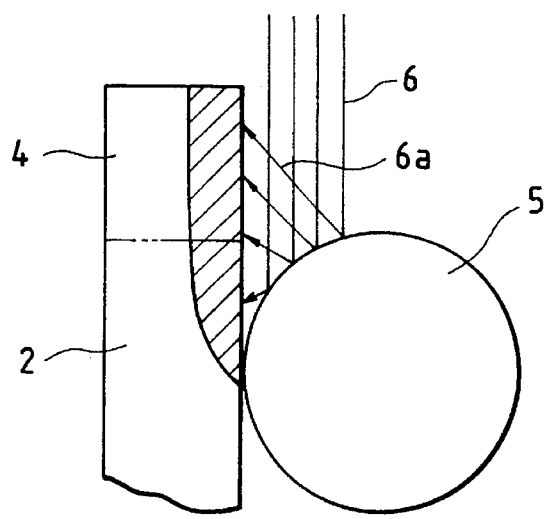
FIG. 5 is a side-elevational view showing the condition of reflection of beams in the structure of the present invention.
Figure 6:
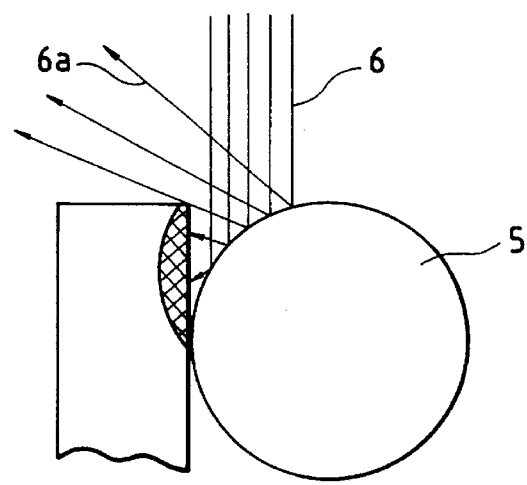
FIG. 6 is a side-elevational view showing the condition of reflection of beams in a conventional structure.

The beams 6 irradiated to the wire 5 are reflected as at 6a as shown in FIG. 5, and impinge on the holding wall 2 and the projection 4 to melt these portions 2 and 4. In a conventional structure as shown in FIG. 6, most of reflected beams 6a from the wire 5 are directed to the outside, so that a large energy loss is encountered, thus achieving a poor fusing efficiency.

Figure 7:
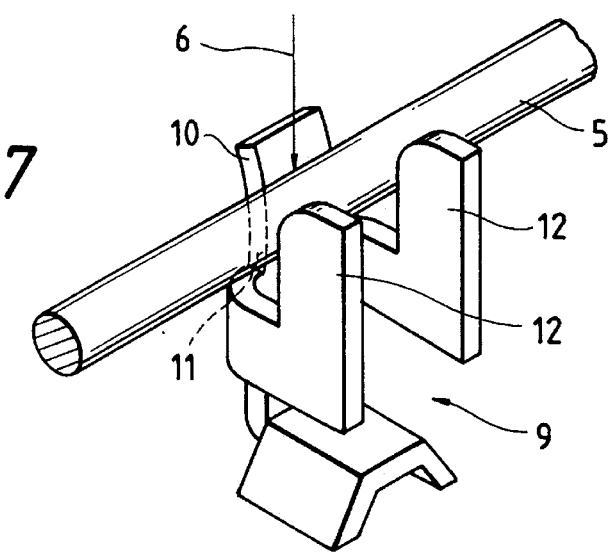
FIG. 7 is a perspective view of a first modified example of the above beam welding terminal structure.

FIG. 7 shows a modified example of beam welding terminal structure of the present invention.

This structure is applied to a relay terminal 9, and includes a holding wall 11 at one side thereof which has an integral projection 10 which is equal in width to the holding wall 11 and projects beyond a wire 5 in a direction of the height. This structure further includes a pair of opposed holding walls 12 and 12 at the other side which are disposed perpendicularly to the holding wall 11. The wire 5 is passed between and held by the holding wall 11 and the holding walls 12. A laser beam 6 is irradiated toward a portion of intimate contact between the holding wall 11 and the wire 5. The wire 5 may, of course, be in the form of a stranded wire with a covering removed. The wire 5 can be introduced into the space between the holding wall 11 and the holding walls 12 from the upper side, and the laser beam can be irradiated in the same direction, and therefore the degree of freedom, for example, for automation is high.

Figure 22:
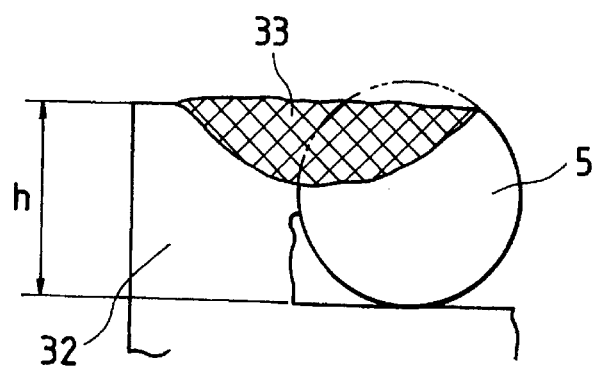
FIG. 22 is a cross-sectional view taken along the line B—B of FIG. 21.

Results of comparison in wire welding strength (tensile strength of the wire in an upper direction) between the above terminal structure (diameter d of wire (UEW): 1.0 mm; test product used: thickness t of holding wall (C5191N): 0.4 mm; height h of projection: 1.5 mm=1.5d) and a conventional terminal structure of FIG. 22 (wire diameter d: 1.0 mm; test product used: thickness t of holding wall: 1.0 mm; height h of projection: 0.6~0.7d) are shown in Table 1. The welding conditions were the same for all samples (charging voltage: 580 V; pulse duration: 10 ms; out-of-focus amount: p±0 mm), and in the measurement of the strength, the other holding wall was cut off.

TABLE 1

| Sample No. | Products of Invention (kgf) | Conventional Products (kgf) |
| --- | --- | --- |
| 1 | 11.35 | 4.53 |
| 2 | 7.65 | 3.62 |
| 3 | 8.27 | 1.17 |
| 4 | 9.54 | 1.67 |
| 5 | 7.71 | 2.71 |
| Average | 8.90 | 2.74 |

As will be appreciated from the above Table, the products of the present invention ace about three times higher in welding strength than the conventional products.

Figure 8:
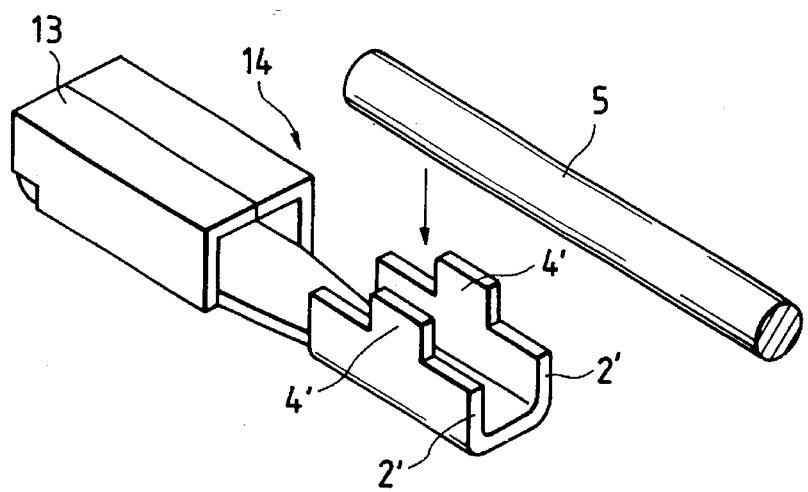
FIG. 8 is an exploded perspective view of a second modified example of the above beam welding terminal structure.

FIG. 8 shows another modified example of beam welding terminal structure of the present invention.

Figure 9:
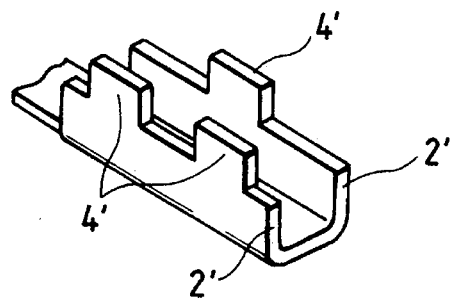
FIG. 9 is a perspective view showing a similar example.

This structure is applied to a female terminal 14 for a connector which terminal has a box-like electrical contact portion 13 at a distal end portion thereof. A pair of holding walls 2' and 2' similar to those of the first embodiment are formed at a proximal end portion of the terminal 14, and a pair of opposed projections 4' and 4' for fusing purposes are formed integrally respectively on the holding walls 2' and 2'. A wire 5 is passed between the holding walls 2' and 2', and the two projections 4' and 4' are fused by a laser beam to thereby firmly weld the wire. If a more firm welding is required, a plurality of fusion projections 4' may be provided on the holding wall 2', as shown in FIG. 9.

Figure 10A:
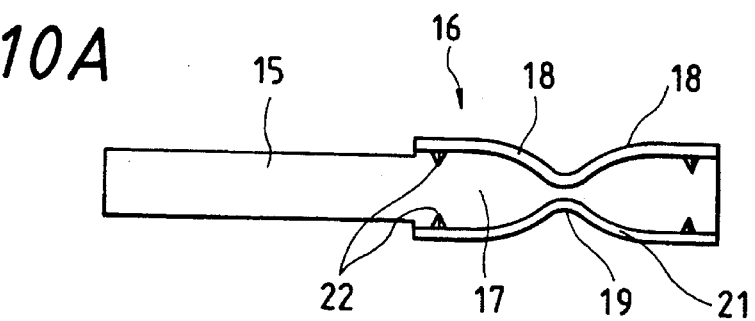
FIG. 10A and 10B shows a second embodiment of a beam welding terminal structure of the present invention, FIG. 10A being a top plan view, and FIG. 10B being a front-elevational view.
Figure 10B:
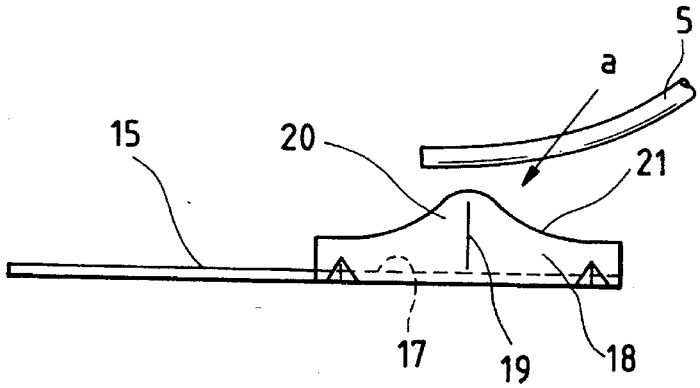

FIGS. 10A and 10B show a second embodiment of a beam welding terminal structure of the present invention.

This structure is applied to a male terminal 16 having a male tab 15 in the form of a flat plate. A pair of holding walls 18 and 18 are formed upright on a bottom plate portion 17, and central portions of the holding walls 18 are bent inwardly to form a reduced-width portion 19, and the reduced-width portion 19 is extended in a direction of the height to provide a projection 20, and a smoothly-curved guide portion 21 extending from a top edge of the projection 20 to the holding wall 18 is formed. A pair of stamped-out portions 22 may be provided on the inner side of the holding wall 18.

A wire 5 is inserted along the guide portions 21 from the upper side. More specifically, an end portion of the wire 5 is held, for example, by the fingers above the male tab 15, and then the wire 5 is urged down in a direction of arrow a, so that the wire 5 is introduced into the reduced-width portion 19, and is held from the opposite sides thereof. The wire is also additionally held by the stamped-out portions 22. Then, a beam welding is effected in a manner described above, so that the wire is firmly connected by fusion of the projections 20.

Figure 11:
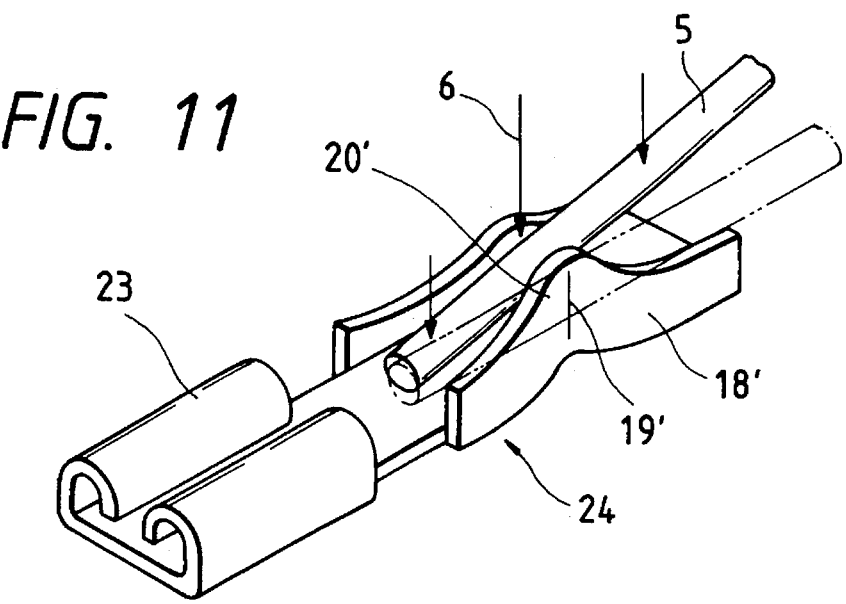
FIG. 11 is a perspective view of a modified example of the above structure.

FIG. 11 shows a modification in which the invention is applied to a female terminal 24 which has a spectacles-like electrical contact portion 23 instead of the male tab 15. In a manner as described above, a wire is inserted between a reduced-width portion 19' formed by holding walls 18', and is firmly welded by fusion of protections 20'.

In the embodiments of FIGS. 10 and 11, when the connection member to be connected, such as the wire 5, is smoothly guided along the upper edges of the projections 20, 20' into the space between the pair of holding walls 18, 18', a retaining force in a vertical direction acts at the surface of contact between the holding wall 18, 18' and the connection member 5, and the two are firmly held against with each other, with no gap formed therebetween.

Figure 12:
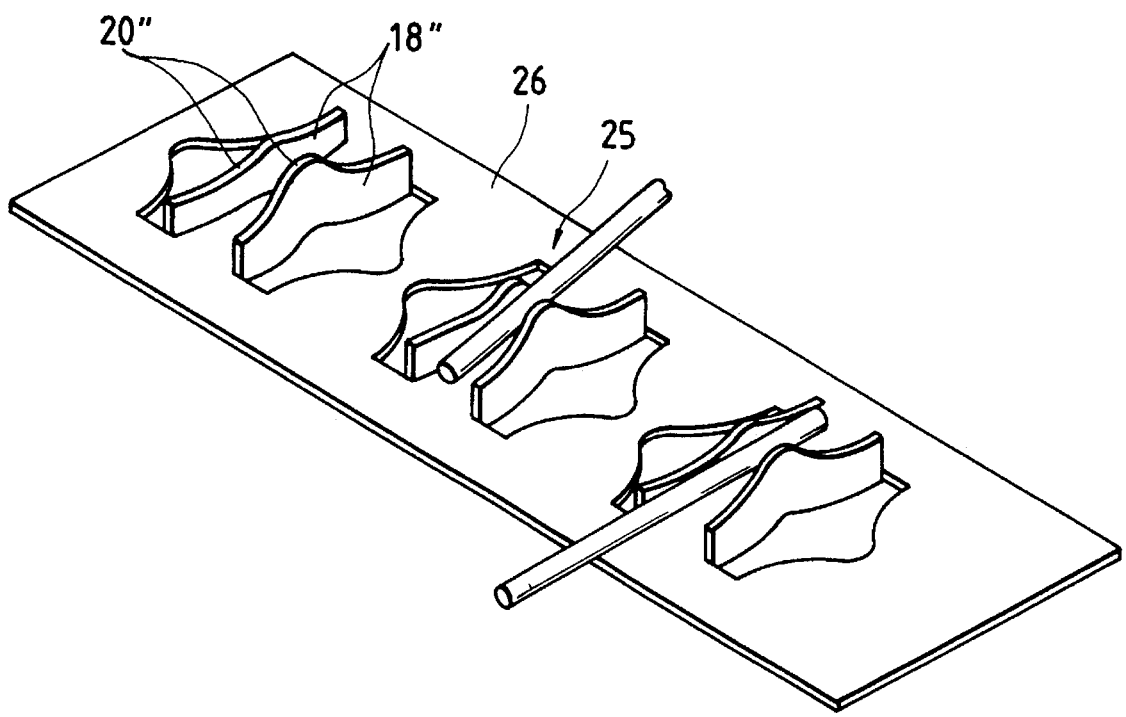
FIG. 12 is a perspective view of another modified example of the above structure.

FIG. 12 shows an earth terminal 25 of an integral construction in which a plurality of terminal structures of the type mentioned above are formed in a juxtaposed manner on a metal base plate 26 by stamping. Holding walls 18" each having a projection 20" are formed by stamping and contraction pressing. This terminal structure can be used, for example, in a branch connection circuit of a circuit board (not shown) described in Japanese Patent Unexamined Publication No. 62-55878.

Figure 13:
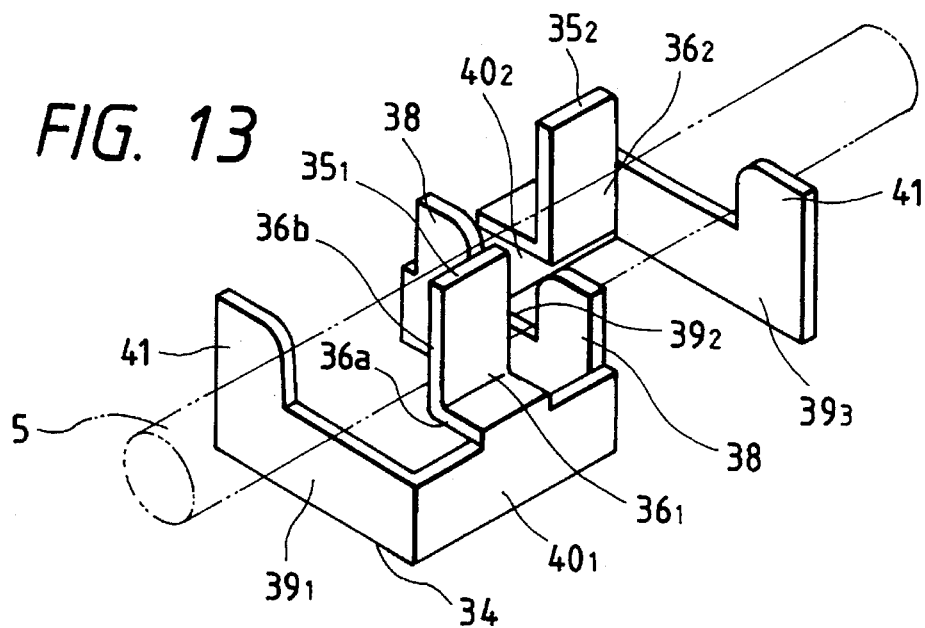
FIG. 13 is a perspective view of a third modified example of the first embodiment of the beam welding terminal structure.

FIG. 13 shows a further developed form of the beam welding terminal structure of FIG. 7. Holding walls $36_1$ and $36_2$ respectively having fusion projections $35_1$ and $35_2$, as well as a pair of holding walls 38 and 38 for holding a wire 5, are formed on a corrugated (two mountains), rectangular wave-shaped, bent base wall 34. The rectangular wave-shaped bent base wall 34 has longitudinal side portions 39 extending in a direction intersecting the wire, and transverse side portions 40 extending in a direction parallel to the wire, the longitudinal and transverse side portions being arranged alternately. The pair of holding walls 38 and 38, having a height generally equal to the diameter d (FIG. 14) of the wire, are formed upright on the upper edge of the central longitudinal side portion $39_2$ in such a manner that the holding walls 38 and 38 can be disposed respectively on opposite sides of the wire 5. The transverse side portions $40_1$ and $40_2$ perpendicularly extend respectively from the opposite ends of the longitudinal side portion $39_2$ in a symmetrical manner, and the holding walls $36_1$ and $36_2$, respectively having the integral projections $35_1$ and $35_2$ projecting beyond the wire diameter d, are formed respectively on the transverse side portions $40_1$ and $40_2$.

The holding wall 36 has a L-shape defined by a horizontal portion 36a, extending from the upper end of the transverse side portion 40 toward the wire, and a vertical portion 36b extending from the horizontal portion 36a in the direction of the height of the wire. The projection 35 is formed integrally with the vertical portion 36b. The holding walls 36 each having the projection 35 are disposed in the direction parallel to the wire, and the pair of holding walls 38 and 38 are opposed to each other, and are disposed in the direction perpendicular to the wire. Holding walls 41 and 41 are formed respectively on distal ends of the opposite longitudinal side portions $39_1$ and $39_3$ extending respectively from the transverse side portions $40_1$ and $40_2$, and these holding walls 41 and 41 are disposed respectively on the opposite sides of the wire 5, and are disposed in opposed relation to the pair of holding walls 38 and 38, respectively. The wire 5 is held between the pair of holding walls 38 and 38, and is also held between the holding walls $36_1$ and $36_2$ having the respective projections $35_1$ and $35_2$ disposed respectively between the pair of clamping walls 38 and one holding wall 41 and between the clamping walls 38 and the other holding wall 41, so that the wire is positively positioned and fixed.

Figure 14:
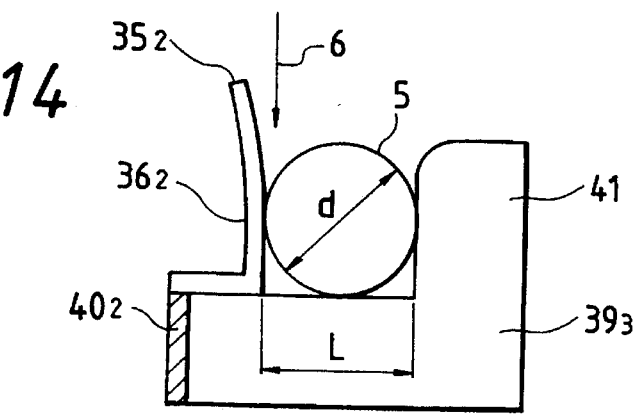
FIG. 14 is a vertical cross-sectional view of the above third modified example.
Figure 15:
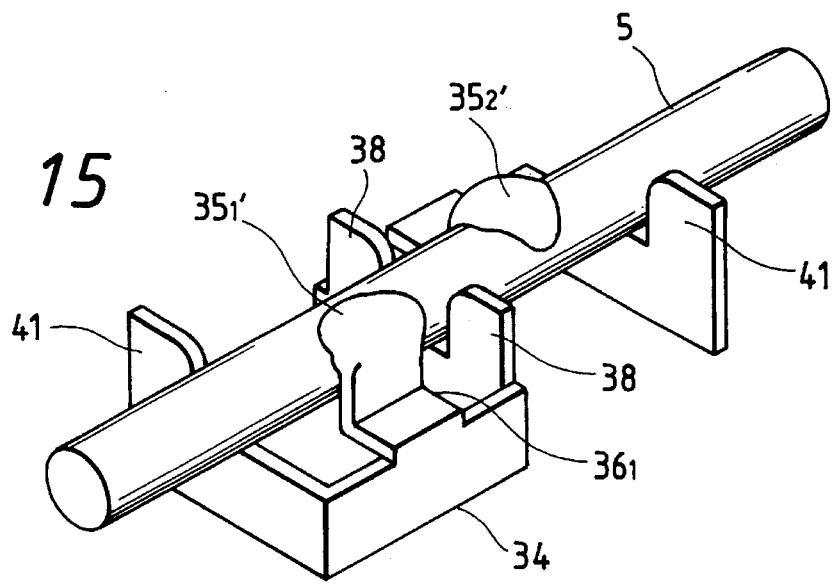
FIG. 15 is a perspective view of the third modified example in a fused condition.

Upon insertion of the wire 5, the holding wall 36 having the projection 35 is resiliently warped or flexed outwardly as shown in FIG. 14, thereby enabling a vertical irradiation of a laser beam 6. The amount of flexing of the holding wall 36 is determined by the distance L between the holding walls 36 and 41. If it is desired to obtain a large holding force, the ability of insertion of the wire 5 is adversely affected, and therefore if it is intended to reduce the insertion force, the amount of warp of the projection 35 is small; however, even in this case, the ability of welding the wire 5 to the holding wall 36 can be enhanced by changing the angle of irradiation of the laser beam 6. FIG. 15 shows a condition after the welding, and the wire 5, while fixedly positioned by the pair of holding walls 38 and 38, is firmly welded and connected by fusion of the two (front and rear) projections as at $35_1'$ and $35_2'$. As a result, there is provided the terminal structure which can allow a large current.

Figure 16:
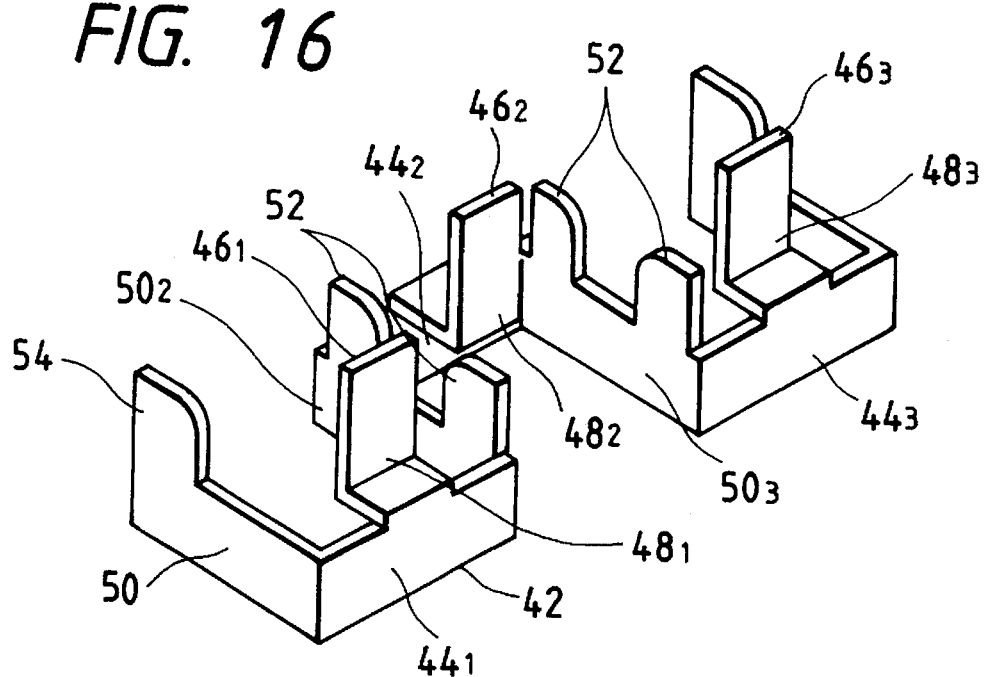
FIG. 16 is a perspective view of a first similar example of the above structure.
Figure 17:
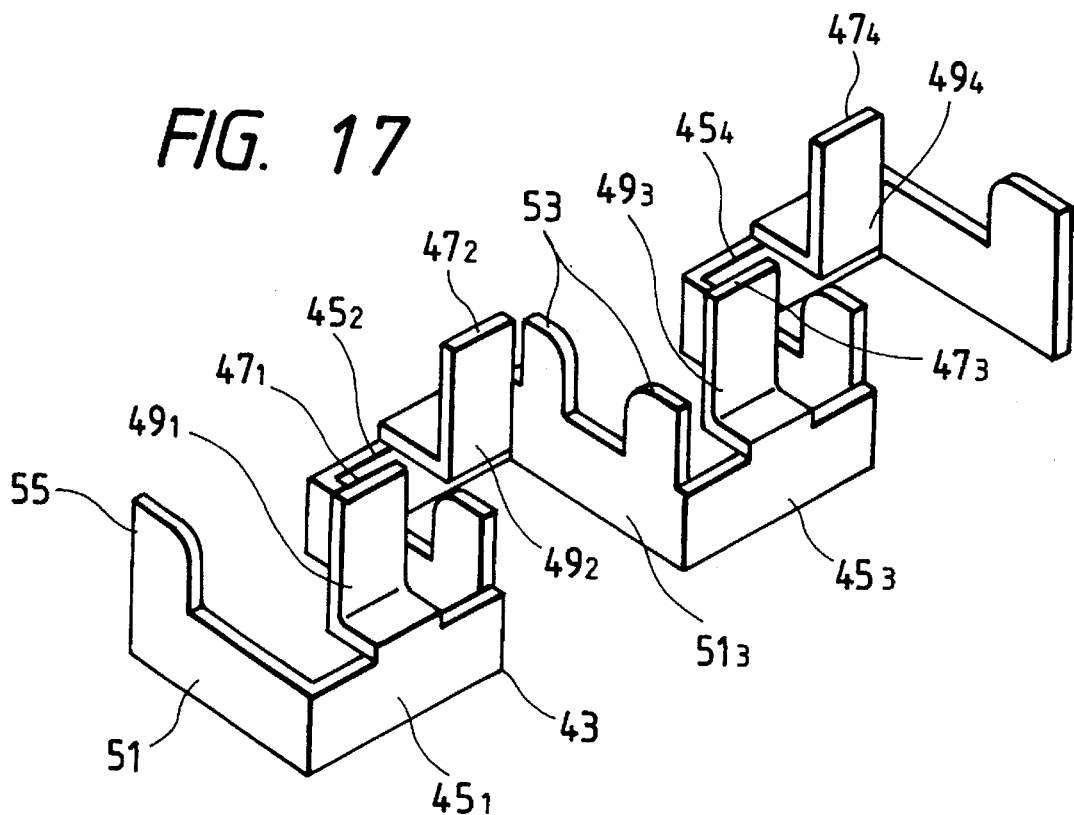
FIG. 17 is a perspective view of a second similar example of the above structure.

FIG. 16 shows an example in which three welding points (fused portions) are provided, and FIG. 17 shows an example in which four welding points are provided. Rectangular wave-shaped base walls 42 and 43 respectively have three (FIG. 16) and four (FIG. 17) mountains arranged in a continuous manner, and holding walls $48_1$ to $48_3$ ($49_1$ to $49_4$) having fusion projections $46_1$ to $46_3$ ($47_1$ to $47_4$) are formed respectively on transverse side portions $44_1$ to $44_3$ ($45_1$ to $45_4$), thus increasing the number of welding points. As in the above embodiment, a pair of opposed holding walls 52 and 52 (53 and 53) are formed on each of longitudinal side portions $50_2$ and $50_3$ ($51_3$) provided near a central portion (or at a central portion), and a holding wall 54 (55) is formed on each of the other longitudinal side portions 50 (51). By thus forming the rectangular wave-shaped base wall 42, 43 in a continuous manner, a desired number of welding points can be provided, and this structure can be used for a wire of another diameter (larger diameter).

Figure 18:
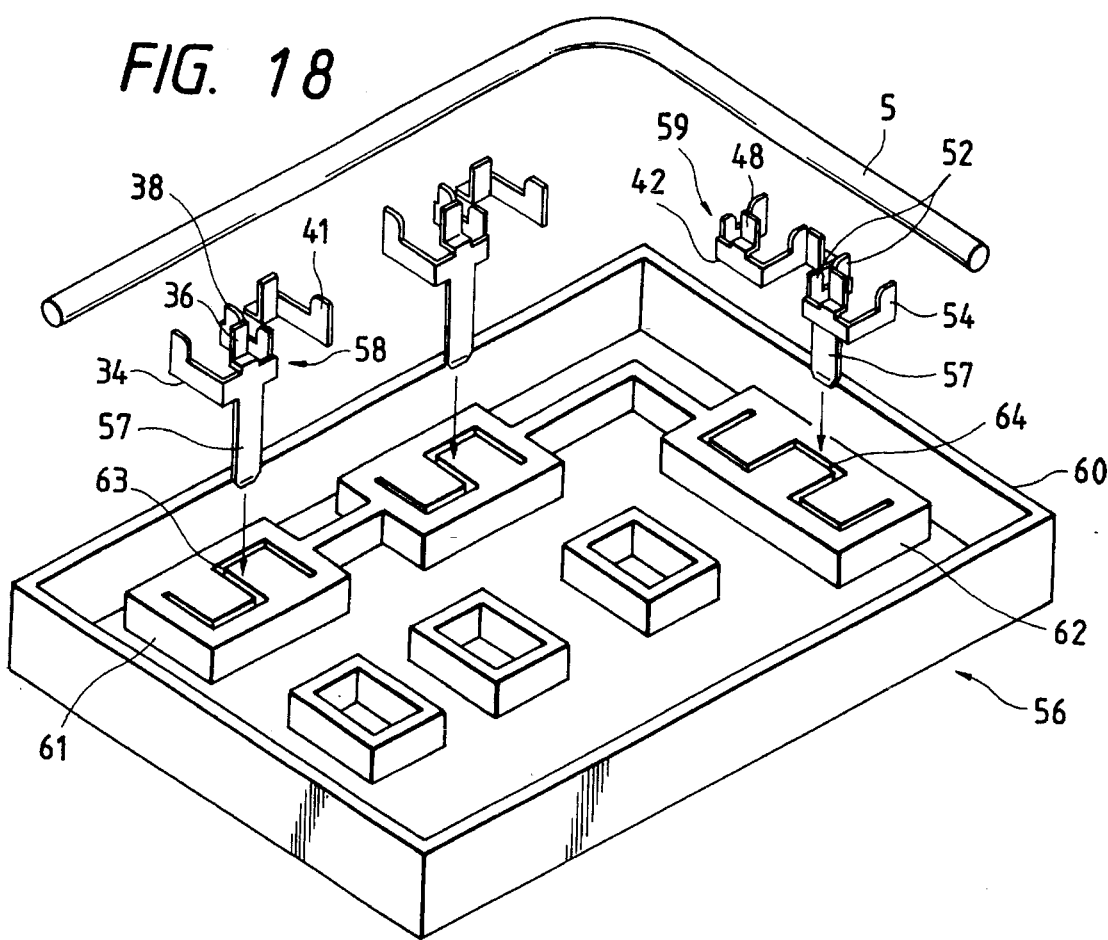
FIG. 18 is an exploded perspective view of a joint box having beam welding terminal structures.

FIG. 18 shows an example in which the above terminal structures are used in a joint box 56. Relay terminals 58 and 59 include respective wave-shaped base walls 34 and 42 which have connection tabs 57, extending respectively from their lower edges, and holding walls 36, 38 and 41 and holding walls 48, 52 and 54 formed respectively on their upper edges. The relay terminals 58 and 59 are inserted respectively into rectangular wave-shaped grooves 63 and 64 formed respectively in connector portions 61 and 62 of a box body 60 of a resin. A wire 5 is installed and inserted relative to the holding walls 36, 38, 41, 48, 52 and 54 of the terminals 58 and 59, and the wire is welded thereto by irradiation of a beam. Here, the insertion of the terminals 58 and 59, the insertion of the wire 5 and the irradiation of the beam are effected by an automation apparatus. The terminal 59 having a larger number of welding points is used as a large current terminal for a power source or the like.

Figure 19:
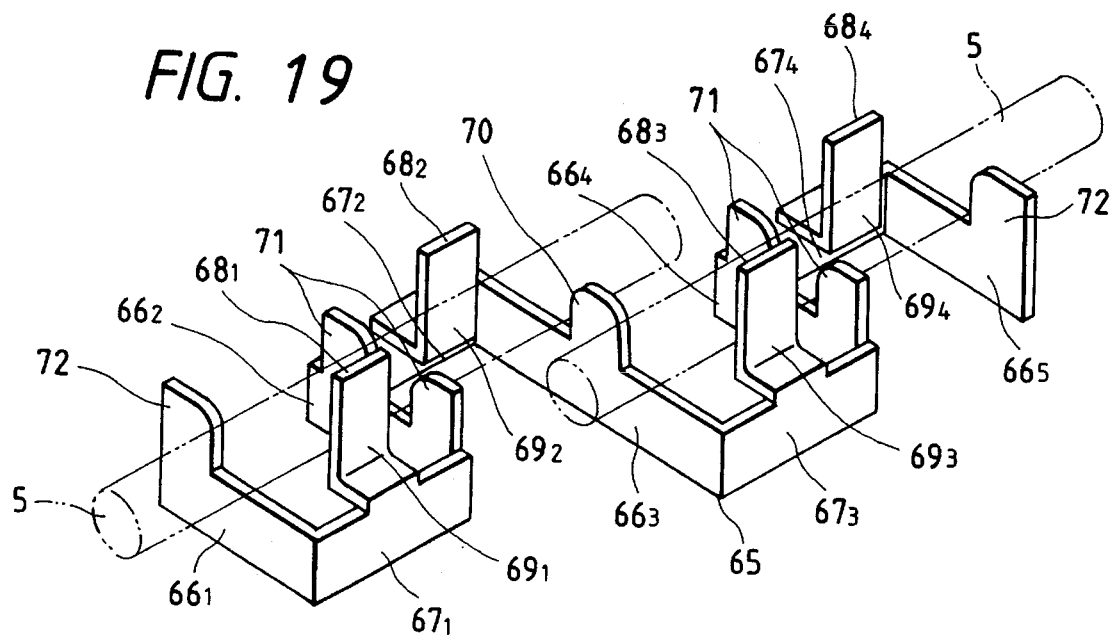
FIG. 19 is a perspective view of an example in which the invention is applied to joint connection of wires.
Figure 20:
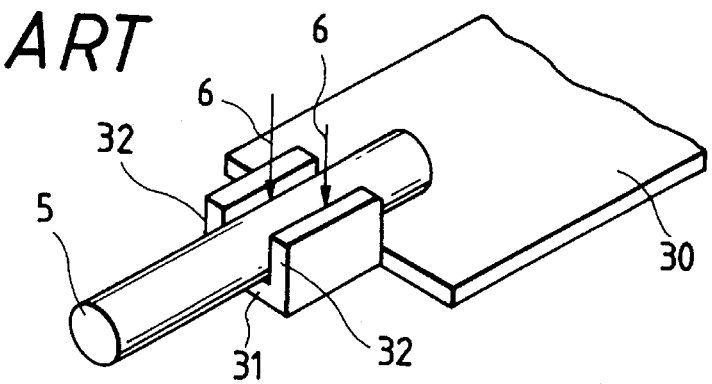
FIG. 20 is a perspective view of a conventional structure in which both of holding walls are fused.
Figure 21:
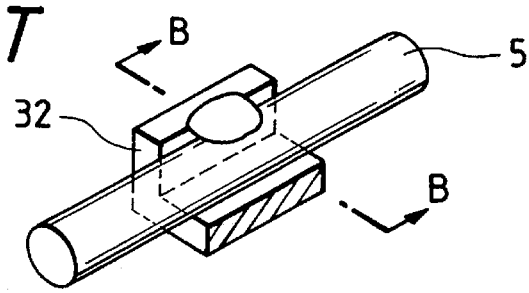
FIG. 21 is a perspective view of the conventional structure showing a condition in which one holding wall is fused.

FIG. 19 shows an example in which a rectangular wave-shaped base wall 65 has a central longitudinal side portion $66_3$ of a greater length, and two wires 5 and 5 are disposed parallel on this longitudinal side portion $66_3$, thereby jointing the two wires 5 and 5 together. Holding walls $69_1$ to $69_4$, having respective fusion projections $68_1$ to $68_4$, are formed respectively on transverse side portions $67_1$ to $67_4$ forming four mountains, and an isolation wall 70 is formed on a central portion of the central longitudinal side portion $66_3$. A pair of wire holding walls 71 and 71 are formed on each of two longitudinal side portions $66_2$ and $66_4$ disposed in opposed relation to the central longitudinal side portion $66_3$, and a holding wall 72 is formed on each of opposite longitudinal side portions $66_1$ and $66_5$. The two wires 5 and 5, extending respectively in forward and backward directions, are inserted in parallel relation to each other, and are isolated from each other by the isolation wall 70 of the central longitudinal side portion $66_3$. The wires are welded by fusing the projections $68_1$ to $68_4$ by a laser beam, and are electrically connected together through the rectangular wave-shaped base wall 65.

Incidentally, the present invention is not limited to the specific embodiments. It is possible to apply the invention equally to electric wires that have different diameters and different kinds of wires, for example.

As described above, in the, present invention, the projection for fusion purposes is provided on the holding wall for the connection member to be connected, and therefore even if a beam is irradiated only to the one-side holding wall, a sufficient fused portion can be obtained. This reduces the labor required for the welding operation, and also enables a firm welding connection. By providing the guide portion on the projection, the wire or the like can be smoothly inserted between the pair of holding walls, thus enhancing the efficiency of the connection operation. Furthermore, by providing a plurality of projections, the connection member to be connected can be more firmly connected, and by holding the connection member with not less than two projections to fixedly position the same, the welding of the connection member to the projections is further enhanced.

What is claimed is:

1. In a beam welding terminal structure, having holding walls for a connection member to be connected, in which said holding walls are formed respectively at opposite sides, wherein one of said holding walls and said connection member are welded, the improvement in which a projection for fusion purposes is formed on at least one of said holding walls, and extends beyond said connection member in a direction of height, in which a rectangular wave-shaped bent base wall has longitudinal side portions, extending in a direction intersecting said connection member, and transverse side portions extending parallel to said connection member; said holding walls each having said projection are formed respectively on said plurality of transverse side portions; and at least one holding wall is disposed on one side of said connection member and is formed on at least one of said longitudinal side portions.

2. In a beam welding terminal structure, having holding walls for a connection member to be connected, in which said holding walls are formed respectively at opposite sides, wherein one of said holding walls and said connection member are welded together, the improvement in which a projection for fusion purposes is formed on at least one of said holding walls, and extends beyond said connection member in a direction of height, wherein a plurality of projections are arranged in a staggered manner on the holding walls.

3. A beam welding structure, comprising:
a terminal body including a bottom wall and a pair of opposing side walls defining a space therebetween in which a connection member is received, said connection member extending in a longitudinal direction, wherein at least one of said side walls includes a projection extending therefrom, the width of said projection in said longitudinal direction being less than a corresponding width of said at least one side wall, wherein said connection member is welded to the terminal body by melting said projection.

4. The beam welding structure of claim 3, wherein said at least one side wall and said projection are deformed inwardly toward the other of said side walls so as to define a bend extending in a transverse direction, perpendicular to said longitudinal direction.

5. The beam welding structure of claim 3, wherein both of said side walls include said projection.

6. The beam welding structure of claim 5, wherein said projections face one another.

7. The beam welding structure of claim 5, wherein the projections are staggered in said longitudinal direction with respect to each other.

8. A beam welding structure, comprising:
a terminal body for receiving and retaining a connection member therein with said connection member extending in a longitudinal direction, said terminal body including (1) a U-shaped base portion defined by a longitudinally extending base and a pair transversely extending sides; and (2) a first side wall extending from said base and a pair of opposing second side walls respectively extending from said sides, said first side wall being arranged perpendicular to said second side walls, said connection member being retained between said first side wall and said pair of second side walls.

* * * * *